US008773467B2

(12) United States Patent
Chen-Quee et al.

(10) Patent No.: US 8,773,467 B2
(45) Date of Patent: Jul. 8, 2014

(54) ENHANCED ASSET MANAGEMENT AND PLANNING SYSTEM

(75) Inventors: Mark S. Chen-Quee, Tarrytown, NY (US); Suzanne Carol Deffeyes, Austin, TX (US); Neil Alan Katz, Parkland, FL (US); Brian O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 13/158,715

(22) Filed: Jun. 13, 2011

(65) Prior Publication Data

US 2012/0313963 A1 Dec. 13, 2012

(51) Int. Cl.
*G06T 19/00* (2011.01)

(52) U.S. Cl.
USPC .......................................... 345/633; 345/632

(58) Field of Classification Search
None
See application file for complete search history.

(56) References Cited

U.S. PATENT DOCUMENTS

| | | | |
|---|---|---|---|
| 5,958,012 A | 9/1999 | Battat et al. | |
| 6,421,571 B1 | 7/2002 | Spriggs et al. | |
| 6,707,381 B1 * | 3/2004 | Maloney | 340/568.1 |
| 6,711,291 B1 * | 3/2004 | Stubler et al. | 382/195 |
| 7,506,264 B2 | 3/2009 | Polan | |
| 7,579,960 B2 | 8/2009 | Cheng et al. | |
| 7,765,286 B2 | 7/2010 | Mark et al. | |
| 7,805,473 B2 | 9/2010 | Ward | |
| 7,843,471 B2 * | 11/2010 | Doan et al. | 345/633 |
| 7,949,568 B2 * | 5/2011 | Fano et al. | 705/22 |
| 8,438,199 B1 * | 5/2013 | Cleveland et al. | 707/957 |
| 2002/0147597 A1 * | 10/2002 | Connors et al. | 705/1 |
| 2005/0236571 A1 * | 10/2005 | Suzumura | 250/338.1 |
| 2007/0005382 A1 * | 1/2007 | Sayers | 705/1 |
| 2007/0100713 A1 * | 5/2007 | Del Favero et al. | 705/29 |
| 2007/0265089 A1 | 11/2007 | Robarts et al. | |
| 2009/0210813 A1 * | 8/2009 | Sawczak et al. | 715/771 |
| 2009/0319058 A1 | 12/2009 | Rovaglio et al. | |
| 2010/0026650 A1 * | 2/2010 | Srivastava et al. | 345/173 |
| 2010/0138530 A1 * | 6/2010 | Brillhart et al. | 709/224 |
| 2011/0222774 A1 * | 9/2011 | Hong et al. | 382/190 |
| 2012/0117502 A1 * | 5/2012 | Nguyen et al. | 715/769 |
| 2012/0249588 A1 * | 10/2012 | Tison et al. | 345/633 |

OTHER PUBLICATIONS

Shelving Made Easy (or Easier) by Jennifer Howard Apr. 6, 2011, 4:18 pm http://chronicle.com/blogs/wiredcampus/shelving-made-easy-or-easier/30792.*
Location based Applications for Mobile Augmented Reality by Gerhard Reitmayr AUIC '03 Proceedings of the Fourth Australasian user interface conference on User interfaces 2003—vol. 18 http://dl.acm.org/citation.cfm?id=820103.*
Master's Thesis: Display Technologies for Augmented Reality Support in Logistics Jul. 15, 2006 http://wwwnavab.in.tum.de/Students/DaFrimor.*
http://worldvillage.com/virtus-walkthrough-pro-2-0, retrieved on Feb. 21, 2010.

* cited by examiner

*Primary Examiner* — David Zarka
*Assistant Examiner* — Jason Pringle-Parker
(74) *Attorney, Agent, or Firm* — Cahn & Samuels, LLP

(57) ABSTRACT

An embodiment of the invention provides a method for displaying information on a portable device, wherein the portable device includes an interface, a camera, and a screen. The interface identifies an object to be installed; and, the camera captures at least one image, wherein the image includes locations for installing objects. The screen displays an augmented image of locations for installing objects, wherein the augmented image identifies at least one optimal location for installing the object.

19 Claims, 4 Drawing Sheets

ENHANCED ASSET MANAGEMENT AND PLANNING SYSTEM

BACKGROUND

The present invention is in the field of systems, methods, and computer program products for enhanced asset management and planning.

Augmented reality is a term for a live direct or indirect view of a physical real-world environment whose elements are augmented by virtual computer-generated imagery. It is related to a more general concept called mediated reality in which a view of reality is modified by a computer. As a result, the technology functions by enhancing one's current perception of reality. Generally, the augmentation is conventionally in real-time and in semantic context with environmental elements, such as sports scores on TV during a game. With the help of advanced augmented reality technology, the information about the surrounding real world of the user becomes interactive and digitally usable. Artificial information about the environment and the objects in it can be stored and retrieved as an information layer on top of the real world view. Commonly known examples of augmented reality are the yellow "first down" lines seen in television broadcasts of American football games and the colored trail showing location and direction of the puck that was used in television broadcasts of ice hockey games in the 1990's. The real-world elements are the football field and players, and the virtual element is the yellow line, which is drawn over the image by computers in real time.

SUMMARY OF THE INVENTION

An embodiment of the invention provides a method for displaying information on a portable device, wherein the portable device includes an interface, a camera, and a screen. The interface identifies an object to be installed; and, the camera captures at least one image, wherein the image includes locations for installing objects. The screen displays an augmented image of locations for installing objects, wherein the augmented image identifies at least one optimal location for installing the object.

Another embodiment of the invention provides a method for maintaining an inventory with a portable device, wherein the inventory includes locations for installing objects, recorded objects installed in the locations, and recorded vacancies in the locations. A camera captures at least one image of a select area, wherein the select area includes locations for installing the objects. A screen displays an augmented image of the selected area, wherein the augmented image displays the inventory of the select area, which includes a recorded object and/or a recorded vacancy. Input is received from an interface of the portable device, wherein the input indicates error(s) in the inventory of the select area. A processor updates the inventory based on the received input.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides an augmented reality system that assists with asset location, installation, planning, and bookkeeping (also referred to herein as "inventory" or "auditing") within large data centers. When used for installation, the system identifies the asset (also referred to herein as object, hardware, or component) to be installed. Upon identification, the system suggests which rack location in the data center to place the asset. The installer verifies the rack to install the asset and selects which space in the rack to install the asset. In at least one embodiment, the system suggests an optimal placement location. The system automatically updates the asset auditing solution with the asset location.

The automated bookkeeping lessens human error and reduces corresponding labor costs associated with assets. Furthermore, the asset location planning elements increase data center efficiency and further reduces costs compared to manual or random placement methods. The convenience of being able to update while in the data center increases the likelihood of the engineer recording accurate data and not forgetting to update a manual asset service. The system also keeps engineers from painstakingly trying to measure location data. In this system, location data, like the height of an asset off the floor, is computed by a mobile device (also referred to herein as a "portable device" or "device"); the user does not have to measure distances. Additionally, the augmented reality view visually guides the user to select the optimal location to install the asset using real time data from an asset management system. The system also allows the engineer to visually detect errors in an asset management system. For example, if an asset was moved, but the location data is not updated, the augmentation overlaid on the rack will reflect that error to the user when the user holds the mobile device up to the rack of servers. This allows errors that were previously undetected to be caught and corrected.

Figure 1:
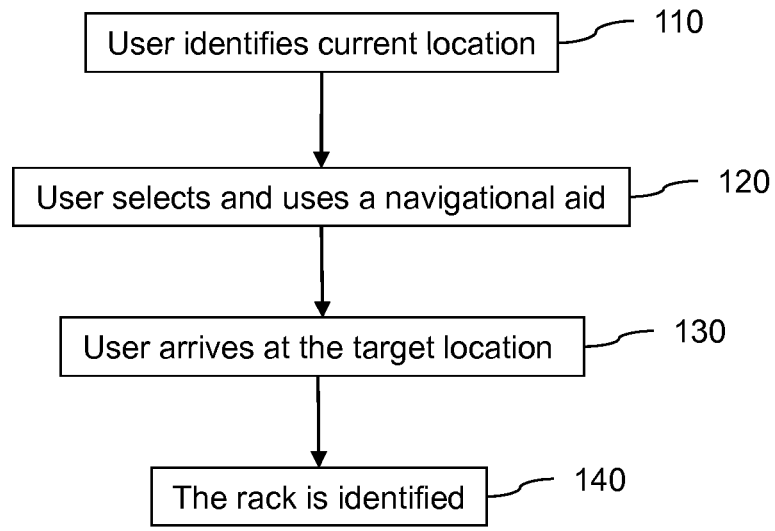
FIG. 1 is a flow diagram illustrating a method of asset location according to an embodiment of the invention.

FIG. 1 is a flow diagram illustrating a method of asset location according to an embodiment of the invention. The asset location functions of the system are used to assist individuals in locating a particular asset in a data center or computer laboratory. This function may be of particular use to computer engineers dispatched to investigate and/or repair faulting computing devices. The user identifies their current location within the data center 110. The identification may take place by the user pointing on a virtual map to identify their location, using text input to identify their location, or scanning an element such as a quick response (QR) code or a barcode of an object near them.

The user selects and uses a navigational aid 120. The asset location function provides mapping and/or direction services to an individual unfamiliar with a specific data center. In one embodiment, the navigational aid is an elevated view of the data center floor plan displayed on a portable device along with information depicting where the target asset is in relation to the user's current location. In another embodiment, a compass and/or camera capturing video or images is used to augment reality and guide the user to the proper location.

Once the user arrives at the proper location 130, the rack is identified using a variety of methods 140. In at least one embodiment, the system highlights the rack location of the asset using augmented reality on the mobile device's video capture. In another embodiment, an installed indicator is programmatically turned on, such as an LED light on the device. The asset location function aids the user in distinguishing the asset from other assets installed in the rack.

Figure 2:
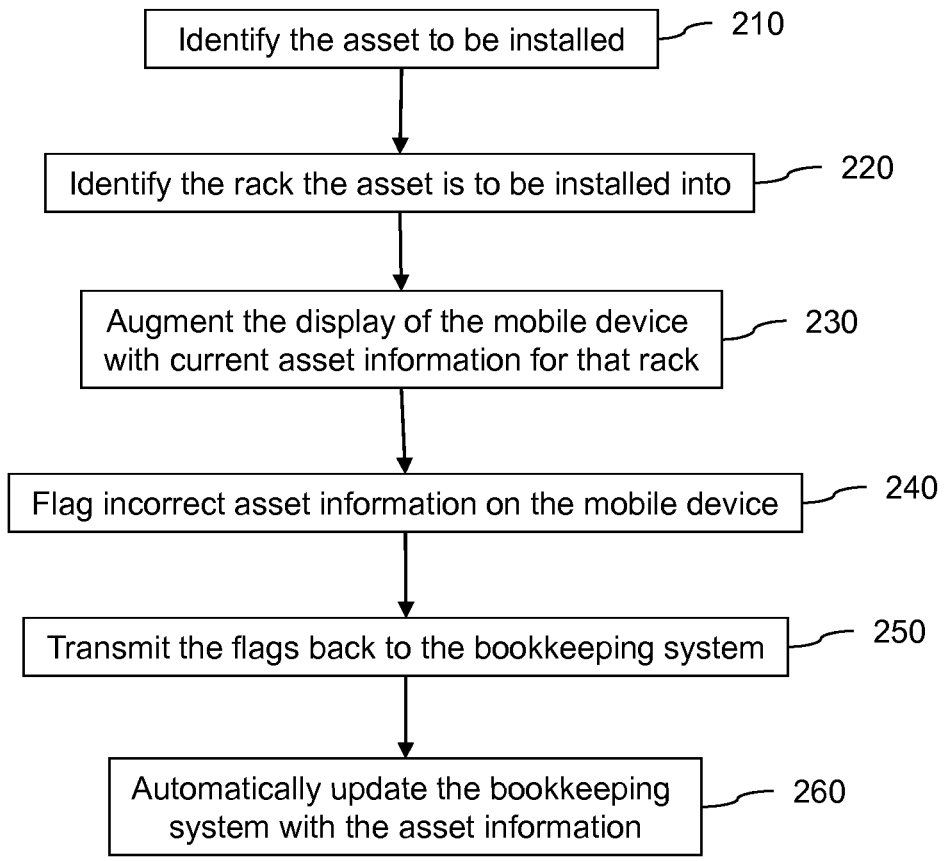
FIG. 2 is a flow diagram illustrating a method of asset installation according to an embodiment of the invention.

FIG. 2 is a flow diagram illustrating a method of asset installation according to an embodiment of the invention. The user identifies the asset to be installed 210. In at least one embodiment, the user scans the barcode of the asset with a mobile device. In another embodiment, the asset is identified with the mobile device based on its picture using imagine processing technology, by entering asset information into the mobile device using text based entry, or by selecting the asset from a list on the mobile device.

Once the asset is identified, the user identifies the rack the asset is to be installed into 220. Rack identification is accomplished using, for example, QR codes, asset bar codes, and/or by identifying the rack via its rack number and selecting the rack number from a list on the mobile device.

Once the rack is identified, the display of the mobile device is augmented with current asset information for that rack 230. In at least one embodiment, a color scheme is used to augment the display. For example, blocks of red indicate occupied location(s) in the rack, and blocks of blue indicate location(s) on the rack that are suitable for the asset.

In at least one embodiment of the invention, the user detects a discrepancy in the bookkeeping, such as locations identified as empty locations having assets in them or empty locations that are identified as occupied. The user flags incorrect asset information on the mobile device 240 and the flags are transmitted back to the bookkeeping system, which may prompt further investigation and/or updating of the bookkeeping for the flagged location(s) and/or flagged asset(s) 250. After the asset is installed, the bookkeeping system is automatically updated with the installed asset information 260.

At least one embodiment of the invention assists the user in selecting the optimal asset installation based on constraints and goals. The goals (e.g., reducing energy consumption, reducing labor costs) may be used in conjunction or independently. In other words, each goal may be ranked such that the optimal placement is a combination of goals.

Energy consumption may be reduced by placing assets of various heat signatures in specific locations within a data center. For example, it may be optimal to either spread out or group together assets with high heat output. In some advanced data centers, controls exist to provide additional cooling to specific parts of the data center based on the localized temperature of that area. In such a data center, HVAC savings may be recognized by placing device(s) that need additional cooling into a central location. In other data centers, it may be best to spread out the assets with high heat signatures. In at least one embodiment, the mobile device display is augmented to indicate to the user which locations would be optimal through the use of a coloring scheme. Heat signatures of various assets may be stored in a remote data store and accessed by the mobile device. Heat signature information may also be retrieved during asset identification, described above. In one embodiment, the data store is an internal memory unit located within the mobile device.

Some assets have higher failure rates than others and there is a labor cost associated with repairing failure hardware. The more time a computer engineer spends locating a device, the less efficient the engineer is, leading to additional labor costs. Therefore, it might be optimal to place an asset having a higher failure rate on the edges of rack rows or in more prominent locations within a data center. Furthermore, replacing various parts within a computational asset may be done "on the data center floor", therefore the more space they have to work, the more efficient they may be. Likewise, this method may be extended to selecting the optimal location within a rack. For example, devices located on the very top of a rack may be more difficult to service than those located in the middle.

Figure 3:
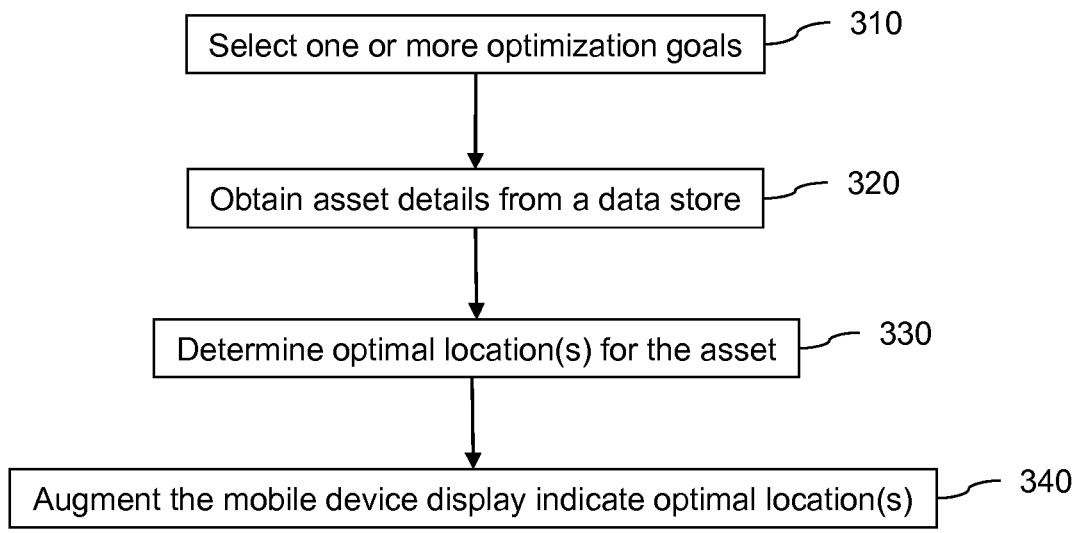
FIG. 3 is a flow diagram illustrating a method of asset installation optimization according to an embodiment of the invention.

FIG. 3 is a flow diagram illustrating a method for proposing a location within a rack based on the perceived reliability of the asset according to an embodiment of the invention. The user selects at least one optimization goal 310. As described above, each goal may be ranked such that the optimal placement is a combination of goals. The mobile device obtains asset details from a data store 320. For example, heat signature information is downloaded from the data store.

The optimal location(s) are determined based on the asset, available space, occupied spaces, locations of other assets, locations of racks, and locations of other resources in the data center 330. The mobile device display is augmented to indicate to the user which rack location(s) and which rack space (s) within that rack location are optimal 340, e.g., through the use of a color scheme. Repair rates for various assets may be stored in a data store and accessed by the mobile device. Repair rate information may also be retrieved during asset identification, described above.

Figure 4:
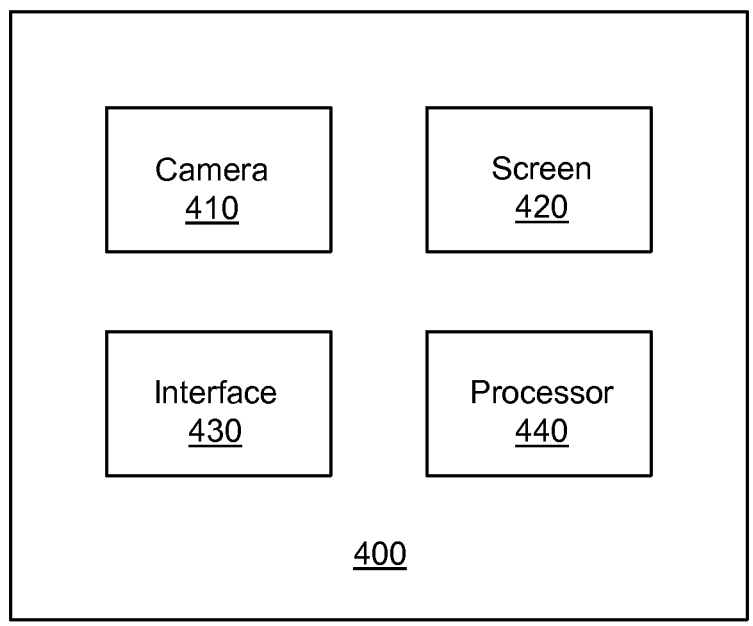
FIG. 4 illustrates a portable device according to an embodiment of the invention.

FIG. 4 illustrates a portable device 400 for managing objects (also referred to herein as assets, hardware, or components) according to an embodiment of the invention. The device 400 (e.g., smart phone, tablet computer) includes a camera 410 for capturing at least one image. As used herein, the term image includes still photographs as well as video. In at least one embodiment, the image includes vacant and/or occupied locations for installing the objects (e.g., racks in a datacenter).

The device 400 further includes a screen 420 connected to the camera 410. As used herein, the term "connected" includes operationally connected, logically connected, in communication with, physically connected, engaged, coupled, contacts, linked, affixed, and attached. In at least one embodiment, the screen 420 displays an augmented installation image identifying optimal location(s) for installing an object. In another embodiment, the screen 420 displays an augmented inventory image including an inventory of a select area, wherein the inventory of the select area includes a recorded object and/or a recorded vacancy.

The device 400 further includes an interface 430 (e.g., keypad, scanner, microphone, camera) for receiving input. In at least one embodiment, the input is the identification of an object to be installed, for example, in a data center. In another embodiment, the input indicates error(s) in the inventory. In at least one embodiment of the invention, the interface 430 is a separate and distinct component from the camera 410 and screen 420. In another embodiment, the camera 410 functions as the interface 430 (e.g., bar code reader). In yet another embodiment, the screen 420 functions as the interface 340 (e.g., touch screen display).

In addition, the device 400 includes a processor 440 connected to the camera 410, screen 420, and/or interface 430. In at least one embodiment, the processor 440 determines an optimal location for installing an object. In another embodiment, the processor 440 updates the inventory based on received input.

Figure 5:
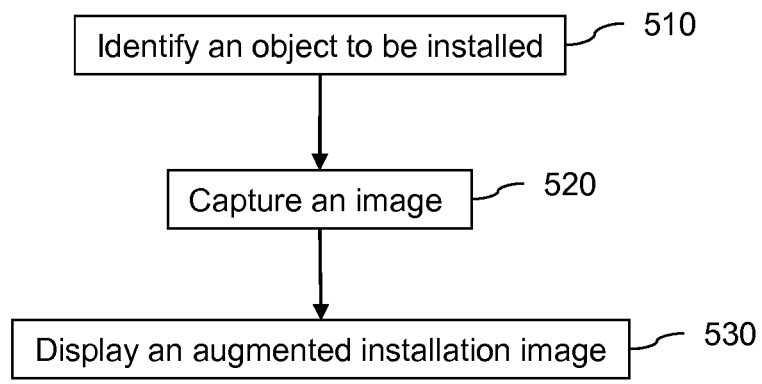
FIG. 5 is a flow diagram illustrating a method for displaying information according to an embodiment of the invention.

FIG. 5 is a flow diagram illustrating a method for displaying information according to an embodiment of the invention, for example, on the portable device 400. An object to be installed (e.g., a server in a data center) is identified 510. In at least one embodiment, a user enters the object to be installed with a keypad. In another embodiment, the object or a barcode on the object is scanned. An image (i.e., still photograph or video) is captured with a camera of the device 520, wherein the image includes locations for installing objects (e.g., racks, rack spaces).

An augmented installation image is displayed on a screen of the device 530, wherein the augmented installation image identifies at least one optimal location for installing the object. The augmented installation image is produced by the processor. The optimal location(s) are determined based on at least one of properties of the object (e.g., asset reliability, heat signature, weight, size, age), placement of other objects in the datacenter, and/or pre-defined goals set by the user of the device and/or administrator of the data center (e.g., asset reliability, heat signatures). The properties of the object are obtained from an internal or remote database (also referred to herein as a "data store").

In at least one embodiment of the invention, the augmented installation image includes at least one first location highlighted in a first color, wherein the first color indicates the highest optimal location. The augmented installation image further includes at least one second location highlighted in a second color different from the first color, wherein the second color indicates a lower optimal location (respective to the highest optimal location). This second augmented installation image is produced by the processor.

In another embodiment, the optimal location(s) are identified on the augmented installation image with an indicator, such as a pointer, text, or the location(s) are enclosed in a box or circle. In yet another embodiment, a user is able to scroll through multiple indicators on the augmented installation image (e.g., one being displayed at a time), wherein the indicators identify multiple locations of increasing or decreasing optimality on the augmented installation image. In at least one embodiment of the invention, the image on the screen is augmented to identify at least one least optimal location for installing the object (e.g., highlighted, encircled, pointer).

Figure 6:
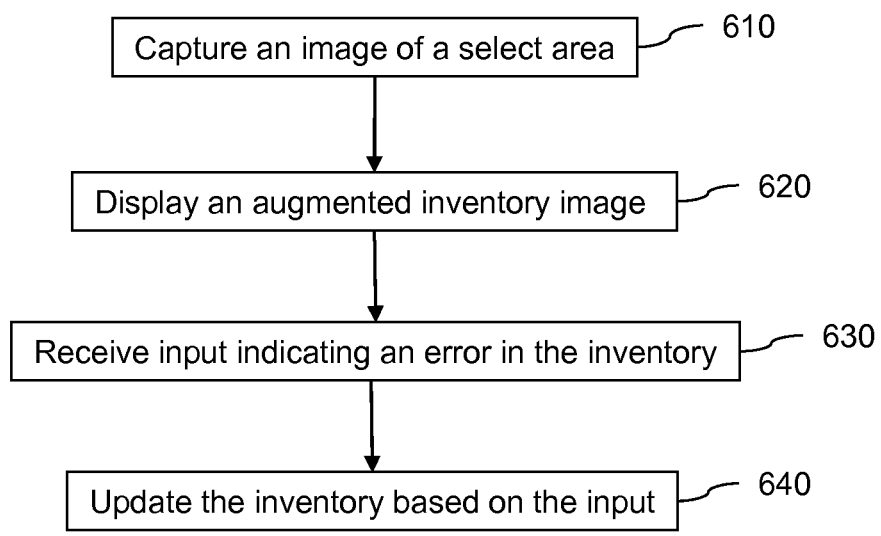
FIG. 6 is a flow diagram illustrating a method for maintaining an inventory according to an embodiment of the invention.

FIG. 6 is a flow diagram illustrating a method for maintaining an inventory according to an embodiment of the invention, for example, with the portable device 400. The inventory includes locations for installing objects (e.g., racks in a data center), recorded objects installed in the locations, and recorded vacancies in the locations. An image (still photographs or video) of a select area is captured with a camera of the portable device 610, wherein the select area includes locations for installing the objects (vacant or occupied).

An augmented inventory image is displayed on a screen of the portable device 620. The augmented inventory image displays the inventory of the select area, wherein the inventory of the select area includes recorded object(s) and/or recorded vacanc(ies). In other words, the augmented inventory image displays, according to the inventory, which locations should be vacant. The augmented inventory image also displays, according to the inventory, which objects should be in which locations, e.g., Object A in location X, Object B in location Y. The augmented inventory image includes indicators to identify the recorded inventory, such as, for example, text balloons pointing to location(s)/object(s), or text superimposed over location(s)/object(s)).

Input is received from an interface of the device 630, wherein the input indicates at least one error in the inventory of the selected area; and, the inventory is updated based on the received input 640. In at least one embodiment, the error is identified by the user after visual comparison of the augmented inventory image and the image (or the actual selected area). In another embodiment, a processor of the device performs image analysis to compare the augmented inventory image and the image.

Thus, the error in the inventory of the select area includes at least one identified mismatch between the augmented image and the captured image. In at least one embodiment, there are three circumstances where a mismatch can occur. First, a mismatch can occur when the augmented image indicates (i.e., illustrates, shows, displays) a recorded vacancy for an occupied location. For example, the augmented image indicates via text balloons or highlighted color scheme that according to the recorded inventory, Location 1 should be vacant; however, Location 1 is occupied by an object as identified via the captured (non-augmented) image or via visual inspection of Location 1.

A mismatch also occurs when the augmented image indicates a recorded object should be present in a vacant location. For example, the augmented image indicates that according to the recorded inventory, an object should be in Location 2; however, Location 2 is vacant as identified via the captured (non-augmented) image or via visual inspection of Location 2. In addition, a mismatch occurs when the augmented image indicates a recorded object in a location occupied by an actual object different from the recorded object. For example, the augmented image indicates that according to the recorded inventory, Object ABC should be in Location 3; however, Location 3 is occupied by Object XYZ as identified via the captured (non-augmented) image or via visual inspection of Location 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
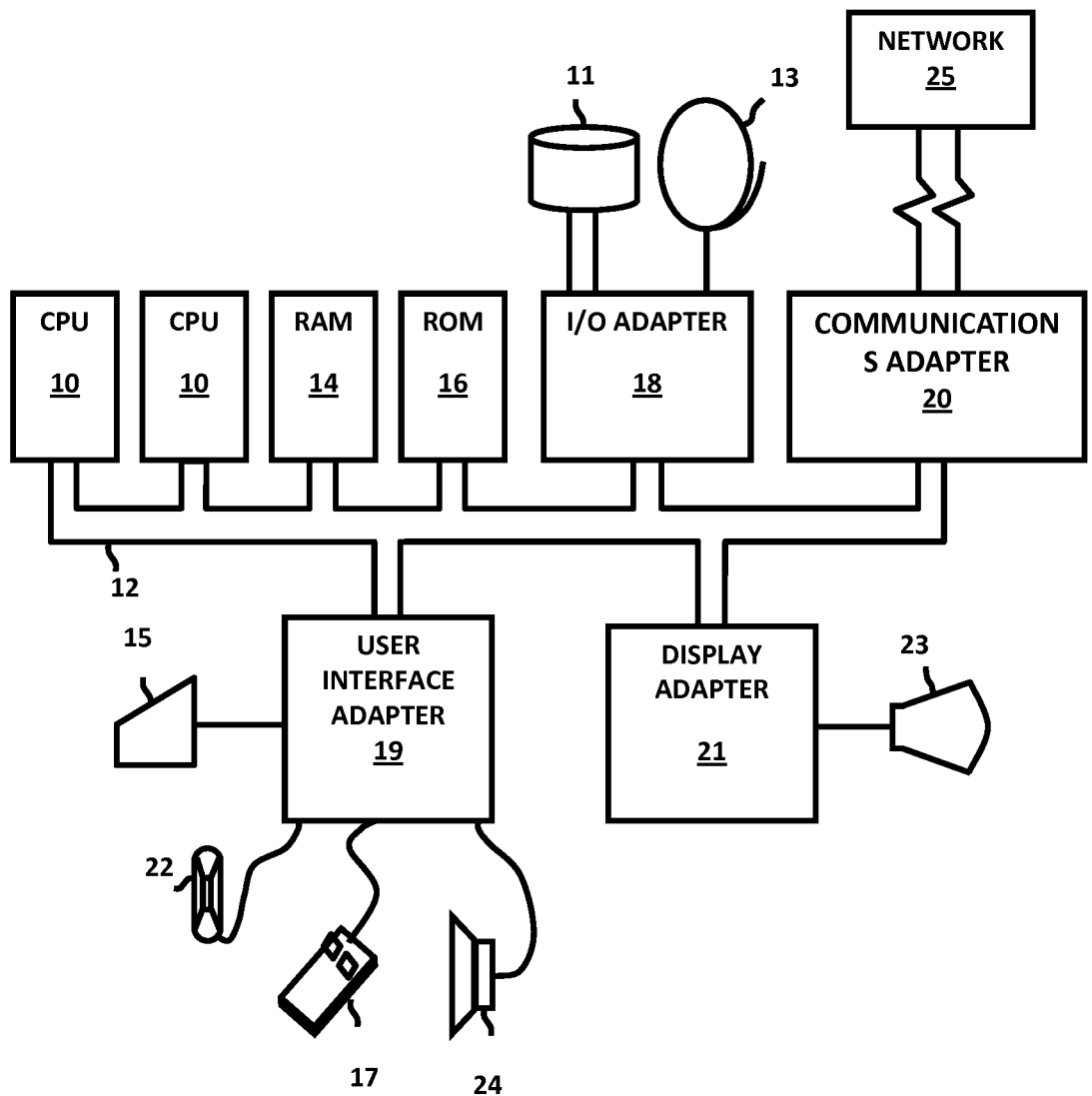
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for displaying information on a portable device, said method comprising:
    identifying an object to be installed;
    capturing at least one image with a camera of the portable device, the image including locations for installing objects;
    displaying an augmented image of multiple locations for installing objects on a screen of the portable device, the augmented image identifying a highest optimal location for installing the object and a lower optimal location for installing the object
    displaying an augmented inventory image on the screen, the augmented inventory image displaying an inventory of a select area, the inventory of the select area comprising at least one of a recorded object and a recorded vacancy;
    receiving input from a human user via a user interface of the portable device, the input indicating at least one identified mismatch between the augmented inventory image and the captured image, wherein the mismatch is identified when at least one of:
        the augmented inventory image indicates the recorded vacancy in an occupied location,
        the augmented inventory image indicates the recorded obiect in a vacant location, and
        the augmented inventory image indicates the recorded obiect in a location occupied by an actual obiect different from the recorded obiect; and
    updating the inventory based on the received input.

2. The method according to claim 1, further comprising determining the highest optimal location for installing the object and the lower optimal location for installing the object based on:
    properties of the object;
    placement of other objects; and
    pre-defined goals.

3. The method according to claim 1, wherein said displaying of the augmented image comprises:
    highlighting at least one first location with a first color, the first color indicating the highest optimal location; and
    highlighting at least one second location with a second color different from the first color, the second color indicating the lower optimal location.

4. The method according to claim 1, further comprising augmenting the image on the screen to identify at least one least optimal location for installing the object.

5. The method according to claim 1, further comprising obtaining properties of the object from a database.

6. The method according to claim 1, wherein the locations for installing objects comprise racks in a datacenter.

7. A method for maintaining an inventory with a portable device, the inventory comprising locations for installing objects, recorded objects installed in the locations, and recorded vacancies in the locations, said method comprising:
    capturing at least one image of a select area with a camera of the portable device, the select area comprising at least one of the locations for installing the objects;
    displaying an augmented image of the selected area on a screen of the portable device, the augmented image displaying an inventory of the select area, the inventory of the select area comprising a recorded object and a recorded vacancy;
    receiving input from a human user via a user interface of the portable device, the input indicating at least one error in the displayed inventory of the select area, the error in the displayed inventory of the select area comprising an identified mismatch between the augmented inventory image and the captured image, wherein the mismatch is identified when:
        the augmented image indicates the recorded vacancy in an occupied location,
        the augmented image indicates the recorded object in a vacant location, and
        the augmented image indicates the recorded object in a location occupied by an actual object different from the recorded object; and
    updating the inventory based on the received input.

8. The method according to claim 7, further comprising displaying an augmented installation image on the screen, the augmented installation image identifying at least one optimal location for installing an object.

9. The method according to claim 8, further comprising determining the at least one optimal location for installing the object based on:
    properties of the object;
    placement of other objects; and
    pre-defined goals.

10. The method according to claim 8, wherein said displaying of the augmented installation image comprises:
    highlighting at least one first location with a first color, the first color indicating a highest optimal location; and
    highlighting at least one second location with a second color different from the first color, the second color indicating a lower optimal location.

11. The method according to claim 8, further comprising augmenting the augmented installation image on the screen to identify at least one least optimal location for installing the object.

12. The method according to claim 8, wherein the locations for installing objects comprise racks in a datacenter.

13. A device for managing objects, said device comprising:
    an interface for identifying an object to be installed;
    a camera for capturing at least one image, the image including locations for installing objects; and
    a screen for displaying an augmented image, the augmented image identifying a highest optimal location for installing the object and a lower optimal location for installing the object, wherein said screen displays an augmented inventory image, the augmented inventory image displaying an inventory of a select area, the inventory of the select area comprising a recorded object and a recorded vacancy,
    wherein said interface receives input indicating at least one identified mismatch between the augmented inventory image and the captured image, wherein the mismatch is identified when at least one of:
        the augmented inventory image indicates the recorded vacancy in an occupied location,
        the augmented inventory image indicates the recorded object in a vacant location, and
        the augmented inventory image indicates the recorded object in a location occupied by an actual object different from the recorded object, and wherein a processor connected to said interface updates the inventory based on the received input.

14. The device according to claim 13, further comprising a processor for determining the highest optimal location for installing the object and the lower optimal location for installing the object based on:
   properties of the object;
   placement of other objects; and
   pre-defined goals.

15. A device for maintaining an inventory, the inventory comprising locations for installing objects, recorded objects installed in the locations, and recorded vacancies in the locations, said device comprising:
   a camera for capturing at least one image of a select area, the select area comprising at least one of the locations for installing the objects;
   a screen for displaying an augmented image, the augmented image displaying an inventory of the select area, the inventory of the select area comprising at least one of a recorded object and a recorded vacancy;
   a user interface for receiving input from a human user, the input indicating at least one error in the displayed inventory of the select area, wherein the error in the displayed inventory of the select area comprises identified mismatches between the augmented image and the captured image, wherein the mismatches are identified when:
      the augmented image indicates the recorded vacancy in a first location and the captured image indicates an occupancy in the first location;
      the augmented image indicates the recorded obiect in a second location and the captured image indicates a vacancy in the second location; and
      the augmented image indicates the recorded obiect in a third location and the captured image indicates a different recorded object in the third location, the different recorded object being different from the recorded object; and
   a processor for updating the inventory based on the received input.

16. The device according to claim 15, wherein the mismatches are identified when:
   the augmented image indicates the recorded vacancy in an actual occupied location;
   the augmented image indicates the recorded object in an actual vacant location; and
   the augmented image indicates the recorded object in a location occupied by an actual object different from the recorded object.

17. The device according to claim 15, wherein said screen further displays an augmented installation image, the augmented installation image identifying at least one optimal location for installing an object.

18. The device according to claim 17, wherein the augmented installation image comprises:
   at least one first location highlighted in a first color, the first color indicating a highest optimal location; and
   at least one second location highlighted in a second color different from the first color, the second color indicating a lower optimal location.

19. The device according to claim 17, wherein said screen further displays a second augmented installation image identifying at least one least optimal location for installing the object.

* * * * *